Feb. 21, 1933.  E. H. FORD  1,898,577
VALVE
Filed Feb. 13, 1931

Inventor
Edwin H. Ford,

By Hood & Hahn.
Attorneys

Patented Feb. 21, 1933

1,898,577

UNITED STATES PATENT OFFICE

EDWIN H. FORD, OF WABASH, INDIANA, ASSIGNOR TO FORD METER BOX COMPANY, OF WABASH, INDIANA, A CORPORATION OF INDIANA

VALVE

Application filed February 13, 1931. Serial No. 515,450.

The object of my invention is to produce a plug valve, more especially designed for use as one of the possible fittings to be used in connection with the installation of a meter-receiving yoke, which may be cheaply manufactured and which, in its open position, will offer a minimum resistance to fluid flow therethrough, the construction being such as to reduce to a minimum deterioration resulting from long undisturbed maintenance in open position.

Figure 1:
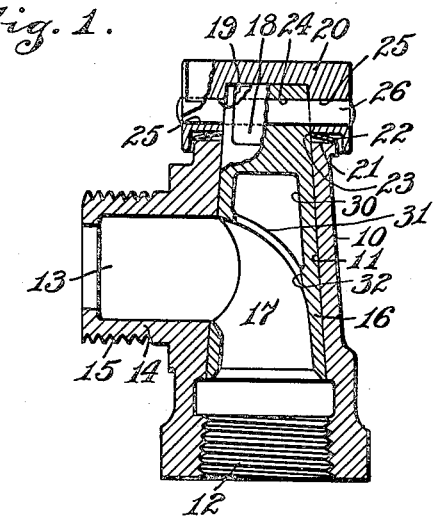
Figure 2:
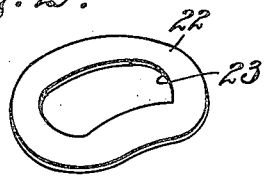

The accompanying drawing illustrates my invention:

Fig. 1 is an axial section of an embodiment of my invention;

Fig. 2 a perspective of one of the spring elements by means of which the plug is yieldingly held upon its seat.

In the drawing 10 indicates the main tubular body having the tapered bore 11 extending axially therethrough and formed at one end 12 for the reception of standard piping. Communicating with the tapered bore 11, at about the middle of the length thereof, is an outlet passage 13 formed through a lateral spud or shank 14 externally threaded at 15.

Journaled in the tapered bore 11, and forming a ground joint therewith, is a tapered plug 16 having a curved passage 17 extending from the larger end of the plug to a point to register with passage 13. Plug 16 is of such length that its smaller end will project through casing 10 and the projected end is flattened at 18 to form a polygonal portion which is nested in a polygonal pocket 19 formed in the end of a manipulating cap 20, the outer end of which is non-circular for the convenient reception of a manipulating wrench or handle (not shown).

The end of casing 10 through which plug 16 is projected is flattened at 21 for the reception of one or more spring washers 22, each of which has a polygonal perforation 23 sized to non-rotatively fit projection 18 of plug 16. Projection 18 is transversely perforated at 24 and cap 20 is transversely perforated at 25, 25 for the reception of a retaining pin 26, these perforations being so placed that, when perforations 25 are aligned with perforation 24, the spring washers 22 will be axially distorted by engagement with the inner end of cap 20 therewith, thus placing plug 16 under the influence of said spring washers to yieldingly urge it firmly into the tapered bore 11.

The laterally directed end of passage 17 of necessity emerges from the side of the plug at a point intermediate the length of the plug and in order that the flow of water through the passage 17 may meet with a minimum resistance due to the change of direction of flow, and in order that plug 17 may be formed of a casting having a minimum internal stress, the plug above passage 17 is chambered at 30, being separated from passage 17 by the curved partition 31 through which extends a comparatively narrow perforation 32 which is formed by a portion of the core, in the molding operation, the ends of which cause the formation of the chamber 30 and the passage 17. I have found in practice that the chambering of plug 17, in the manner described, materially assists in the production of a plug which, during various temperature changes to which the structure is unavoidably subjected, will not become distorted to produce leaks between the main body and the plug.

The spring washers 22, being outside of the main body 10 and away from any possible contact by the fluid passing through the valve structure, are protected against corrosion and deterioration resulting from such corrosion.

In the use of plug valves for fluid control there is a tendency, where the plug remains undisturbed in open position for a long period of time, for the plug to stick in its seat but, as the spring support of the plug is protected against deterioration, the plug may be safely relieved from such sticking by a sharp blow struck upon the cap 20.

I claim as my invention:

A valve comprising a main body having a tapered bore therethrough with a pipe-connection at its larger end, and a tubular lateral extension communicating at its inner end with said tapered bore and having a pipe connection at its outer end, a tapered plug-valve journaled in said tapered bore across the inner end of said lateral extension and with its smaller end projecting from the main body, said plug having an internal chamber at its larger end extending across and beyond said lateral extension with an intermediate curved portion registering with the bore of the lateral extension and having a relatively narrow medial slit affording outlet from the inner closed end of said chamber, said plug also having an open-ended chamber in its smaller end, said two chambers being separated by an imperforate partition intermediate the length of the plug, a cup-like cap sleeved over the smaller end of the plug and adjacent end of the main body and non-rotatively pinned to the plug, and a spring washer nested between said cap and main body.

In witness whereof, I have hereunto set my hand at Wabash, Indiana, this 10th day of February, A. D. one thousand nine hundred and thirty-one.

EDWIN H. FORD.